United States Patent [19]

Nutter

[11] Patent Number: 6,142,698
[45] Date of Patent: Nov. 7, 2000

[54] TELESCOPIC TUBES

[75] Inventor: William Nutter, *deceased, late of Simonstone, United Kingdom, by Debra Sue Nutter, administratrix*

[73] Assignee: Colebrand Limited, London, United Kingdom

[21] Appl. No.: 09/198,479

[22] Filed: Nov. 24, 1998

[30] Foreign Application Priority Data

Nov. 24, 1997 [GB] United Kingdom .................... 9724803

[51] Int. Cl.[7] ...................................... F16B 7/10
[52] U.S. Cl. ...................... 403/109.1; 403/104; 403/377
[58] Field of Search ................... 403/377, 371, 403/368, 374.3, 362, 109, 109.2, 109.1, 109.5, 109.8

[56] References Cited

U.S. PATENT DOCUMENTS

| 2,841,425 | 7/1958 | Oeters ...................................... 403/104 |
| 3,380,097 | 4/1968 | Pharris ...................................... 403/371 |
| 3,722,903 | 3/1973 | Jones ...................................... 403/109.5 |
| 4,154,545 | 5/1979 | Pinto et al. .......................... 403/109.5 |
| 4,378,172 | 3/1983 | Groschupp ............................. 403/104 |
| 4,948,149 | 8/1990 | Lin et al. ................................. 403/104 |
| 5,011,104 | 4/1991 | Fang ......................................... 403/104 |
| 5,433,551 | 7/1995 | Gordon ................................. 403/109.5 |
| 5,649,780 | 7/1997 | Schall ...................................... 403/371 |
| 5,695,297 | 12/1997 | Geib ........................................ 403/371 |

*Primary Examiner*—Lynne H. Browne
*Assistant Examiner*—Kenneth Thompson
*Attorney, Agent, or Firm*—Olson & Hierl, Ltd.

[57] ABSTRACT

There is provided telescoping tube apparatus including an outer tube 11, an intermediate tube 12 and an inner tube 13. The tubes can be telescoped together to provide a single tube of variable length by use of joining sleeves 21 and locking sleeves 31. The joining sleeves 21 include jaw means 24 which is acted upon by the locking sleeves 31 to lock the tubes in the desired position.

6 Claims, 3 Drawing Sheets

TELESCOPIC TUBES

BACKGROUND OF THE INVENTION

It is known to join together telescoping tubes with a clamping sleeve which can be tightened to clamp the tubes in a desired relative position. The present invention provides a special arrangement for securing together two telescopible tubes of which the outer tube has an external threaded portion at the end into which the inner tube is to be inserted and the inner tube has an enlarged ring at the end to be inserted within the outer tube, the diameter of the ring being less than that of the bore of the outer tube. According to the invention there is provided these inner and outer tubes, a joining sleeve having an internal threaded portion at one end for engaging the external threaded portion of the outer tube, an internal shoulder facing said one end of the sleeve, an external threaded portion and a jaw at its other end, a clamping sleeve for screwing onto the external threaded portion of the joining sleeve, the sleeve having means to compress said jaw as it is screwed onto the joining sleeve so as to grip an inner tube placed therein and an expandable locking ring located between said shoulder and the end of the enlarged ring facing away from said end of the inner tube and having a normal internal diameter less than the diameter of the enlarged ring and a normal external diameter intermediate the inner and outer diameters of said shoulder.

BRIEF DESCRIPTION OF THE DRAWINGS

An example of the invention will now be described with reference to the accompanying drawings in which.

DETAILED DESCRIPTION OF THE INVENTION

Figure 1:
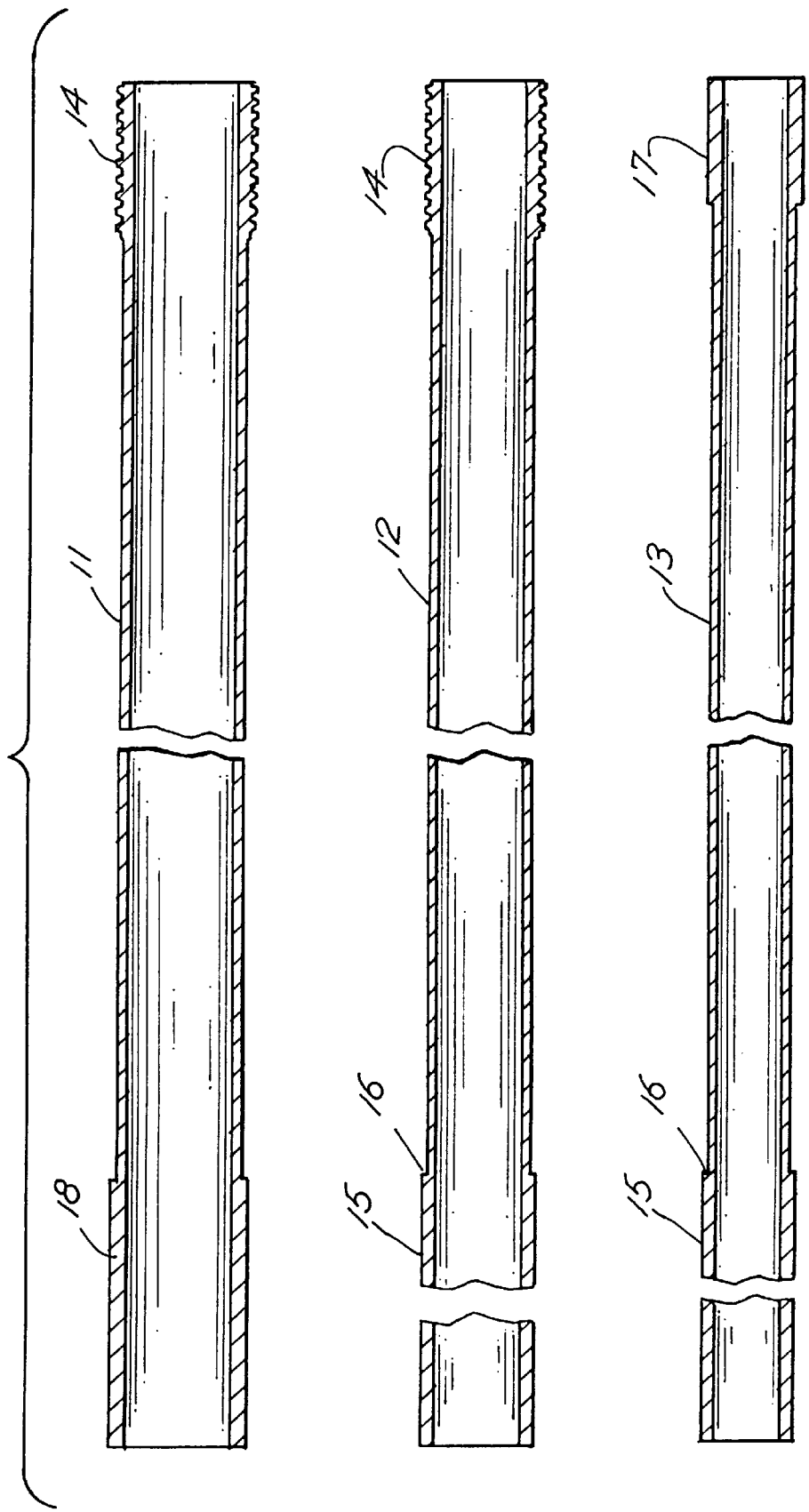
FIG. 1 shows an outer, intermediate and inner tube for telescoping together.

FIG. 1 shows three tubes which can be telescoped together, an outer tube 11, an intermediate tube 12 and an inner tube 13. Each tube has an enlarged portion at each end. In this embodiment, the tubes are formed from carbon fibre and the enlarged portions are cast onto the tube using resin. The enlarged portion 14 at the right-hand end of the outer and intermediate tubes 11 and 12 has an external thread formed therein and the left-hand ends 15 of the intermediate and inner tubes are formed with an integral enlarged ring ending at a shoulder 16 which faces away from the left-hand end of the respective tube. The right-hand end of the inner tube has a plain enlarged portion 17 which does not have a screw-thread formed thereon and is provided to give support to a structure such as a mounting for a hook spigot. The left-hand of the outer tube also has an enlarged portion 18 to protect the end from fracture; this enlarged portion 18 is shorter than the enlarged portions 15 of the intermediate and inner tubes by a factor of three.

Figure 2:
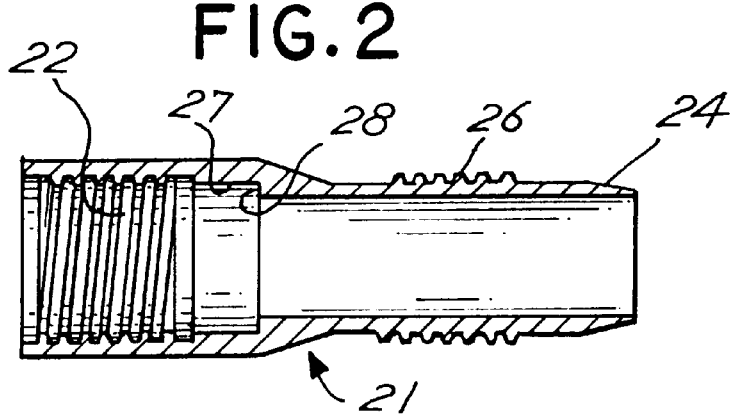
FIG. 2 is a longitudinal section through a joining sleeve.
Figure 3:
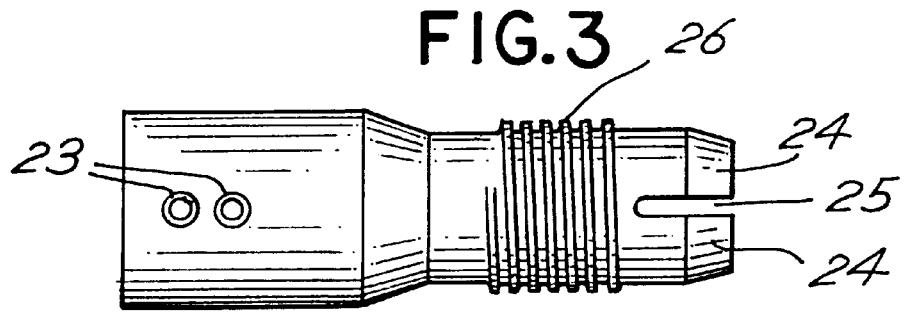
FIG. 3 is a side elevation of the joining sleeve of FIG. 2.

The joining sleeve 21 shown in FIGS. 2 and 3 has its left-hand end of larger diameter than its right-hand end. The left-hand end has an internal threaded portion 22 arranged to engage the external threaded portion 14 of the corresponding tube. As can be seen in FIG. 3, the left-hand end of the sleeve is provided with two holes 23 for screws which can be inserted to lock the tube against rotation within the left-hand end of the sleeve.

The right-hand end of the joining sleeve has three jaws 24 symmetrically arranged around the axis, separated by slots 25. On the side of the jaw 24 remote from the right-hand end, the external surface of the sleeve is formed with a thread 26.

Figure 4:
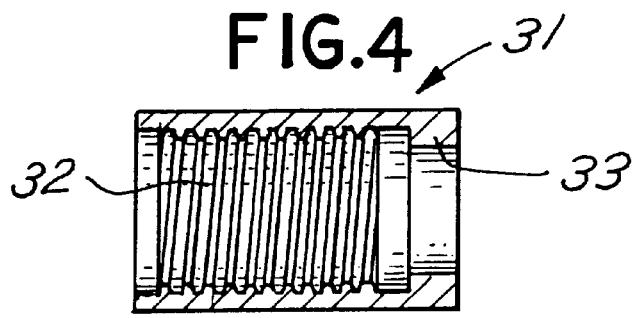
FIG. 4 is a longitudinal section through a clamping sleeve.

FIG. 4 shows a locking sleeve 31 having an internal thread 32 for engaging the external thread 26 of the joining sleeve and an internal stop 33 at its right-hand end which engages the jaws 24 of the joining sleeve as the clamping sleeve is screwed onto the joining sleeve so as to compress the jaws to grip a tube placed within them.

Figures 5, 6:
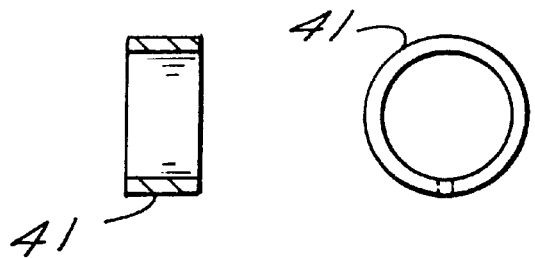
FIG. 5 is a longitudinal section.
FIG. 6 an end elevation of a locking ring.
Figure 7:
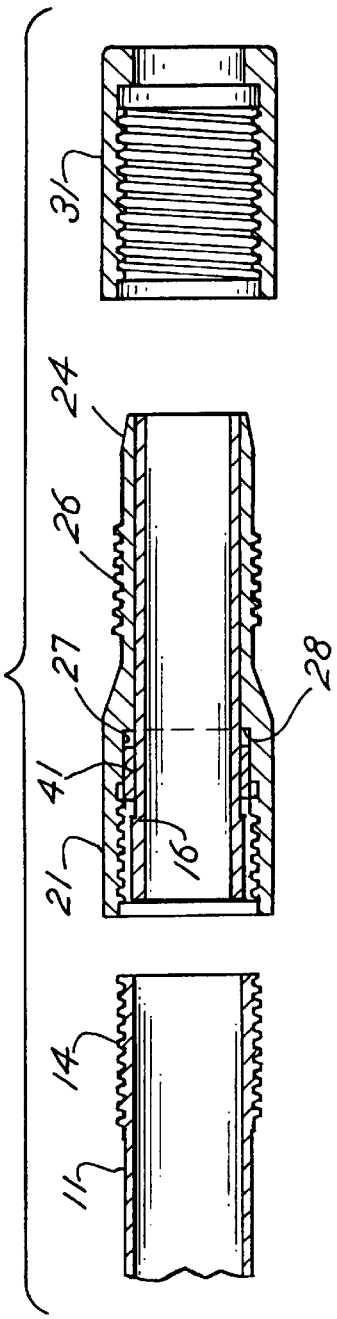
FIG. 7 is an exploded view of components to be joined together.

At an intermediate position within the bore of the joining sleeve between the internal threaded portion at the left-hand end and the bore of the right-hand end is a recess 27 for receiving a split locking ring 41, the split locking ring being illustrated in FIGS. 5 and 6. FIG. 7 is an exploded view of two telescoping tubes (which will here be taken to be the outer tube 11 and the intermediate tube 12), the joining and locking sleeves 21, 31 and the locking ring 41. It will be seen that the locking ring sits within the intermediate recess 27 of the joining sleeve where its right-hand end engages the internal shoulder 28 of the joining sleeve. The left-hand end of the locking ring engages the shoulder 16 formed by the end of the enlarged portion of the intermediate tube remote from its left-hand end.

When the two tubes 11, 12 are in a desired relative axial position, the locking sleeve 31 is screwed onto the joining sleeve 21 so that its internal stop 33 bears on the jaws 24 of the joining sleeve to clamp the joining sleeve against the intermediate tube 12. The outer tube 11 is screwed into the left-hand end of the joining sleeve and fixed in position by insertion of the two locking screws in holes 23. When it is desired to adjust the relative axial position of the two tubes, the locking sleeve 31 is unscrewed slightly to release the jaws 24 and allow the intermediate tube 12 axial movement relative to the outer tube 11. When the new desired position is achieved, the locking sleeve 31 is tightened again so that the jaws clamp the intermediate tube.

Figure 8:
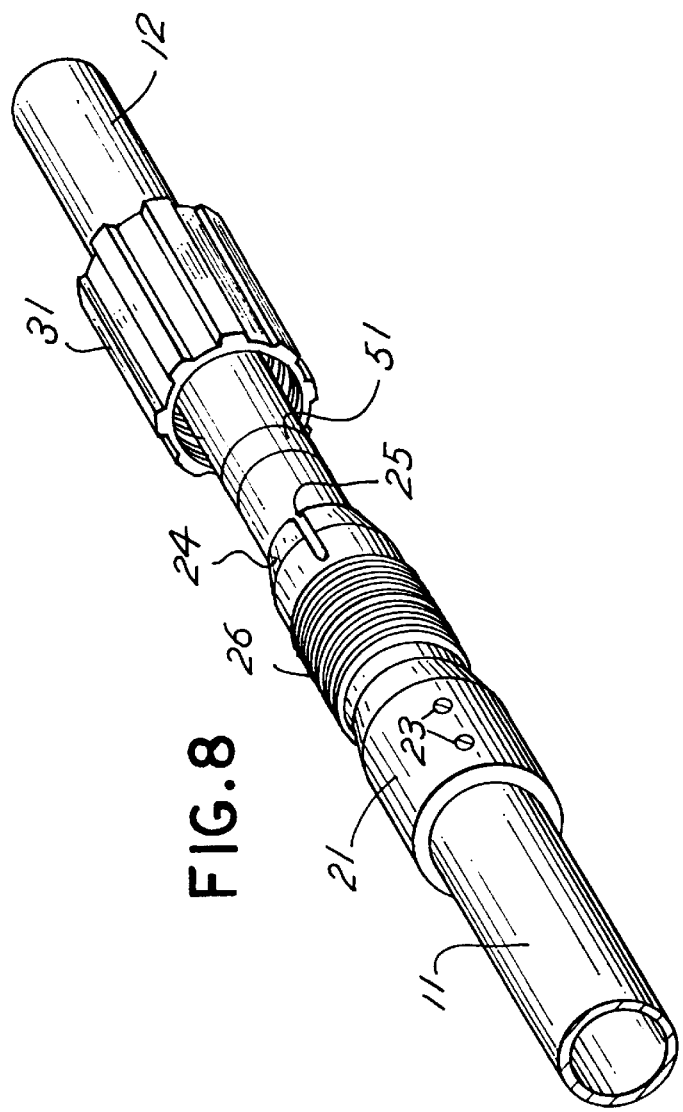
FIG. 8 is a perspective view of the components of FIG. 7 partly assembled.

When it is desired to disassemble the components illustrated in FIGS. 7 and 8, the locking screws are removed from holes 23 and the outer tube 11 unscrewed from the left-hand end of the joining sleeve 21. A few turns of adhesive tape 51 are wound on the intermediate tube 12 to the right of the jaws 24 and the intermediate tube is then moved to the left through the joining sleeve so that the tape 51 engages the right-hand end of the locking ring 41. Further movement of the intermediate tube to the left will extract the locking ring 41 from its recess 27 within the joining sleeve. When the locking ring has been exposed beyond the left-hand end of the joining sleeve, it can be opened out and removed from the intermediate tube 12 and the intermediate tube can then be drawn to the right out of the joining sleeve 21. The components are now completely disassembled.

Although the joining and locking sleeves 21, 31 have been described with reference to the outer 11 and intermediate 12 tubes, similar sleeves can be provided to join the intermediate and inner tubes 12, 13. With three such tubes 11, 12, 13, the length of the assembled tubes can be adjusted between one and almost three units of length and firmly clamped in any desired relative axial position.

What is claimed is:

1. Telescoping tube apparatus, comprising;

an outer tube having an external threaded portion at one end;

an inner tube receivable in the outer tube and having an enlarged ring at the end received by the outer tube;

a joining sleeve having an internal threaded portion at one end for engaging the external threaded portion of the outer tube, an internal shoulder facing said one end of the sleeve, an external threaded portion and jaw means at its other end, a clamping sleeve for screwing onto the external threaded portion of the joining sleeve, having clamping means, and an expandible locking ring located between the shoulder and the end of the enlarged ring facing away from the end of the inner tube and having a normal internal diameter less than the diameter of the enlarged ring and a normal external diameter intermediate the inner and outer diameters of said shoulder, wherein the clamping sleeve releasably compresses the jaw means of the joining sleeve as it is screwed thereon to lock the inner and outer tubes together, and releases the jaw means when it is unscrewed to permit axial sliding movement of the tubes.

2. Apparatus according to claim 1, wherein the joining sleeve is fixed to the outer tube by screw means.

3. Apparatus according to claim 1, wherein the jaw means comprises a plurality of compressible jaw parts.

4. Apparatus according to claim 1, wherein the inner and outer tubes comprise carbon fibre.

5. Apparatus according to claim 1, wherein the threaded portions and enlarged ring of the tubes comprise resin.

6. Telescoping tube apparatus, (Apparatus according to claim 1) comprising:

an outer tube having an external threaded portion at one end;

an inner tube receivable in the outer tube and having an enlarged ring at the end received by the outer tube;

a joining sleeve having an internal threaded portion at one end for engaging the external threaded portion of the outer tube, an internal shoulder facing said one end of the sleeve, an external threaded portion and jaw means at its other end;

a clamping sleeve for screwing onto the external threaded portion of the joining sleeve, having clamping means, and an expandable locking ring located between the shoulder and the end of the enlarged ring facing away from the end of the inner tube and having a normal internal diameter less than the diameter of the enlarged ring and a normal external diameter intermediate the inner and outer diameters of said shoulder, wherein the inner and outer tubes comprise carbon fiber, and wherein the clamping sleeve releasably compresses the jaw means of the joining sleeve as it is screwed thereon to lock the inner and outer tubes together, and releases the jaw means when it is unscrewed to permit axial sliding movement of the tubes.

* * * * *